Sept. 18, 1951 J. J. DUGGAN 2,568,489
MACHINE FOR SKINNING FISH FILLETS
Filed Dec. 28, 1946 4 Sheets-Sheet 1

Inventor:
Joseph J. Duggan,
by Heard Smith Stennant
Attorneys

Sept. 18, 1951  J. J. DUGGAN  2,568,489
MACHINE FOR SKINNING FISH FILLETS
Filed Dec. 28, 1946  4 Sheets-Sheet 2
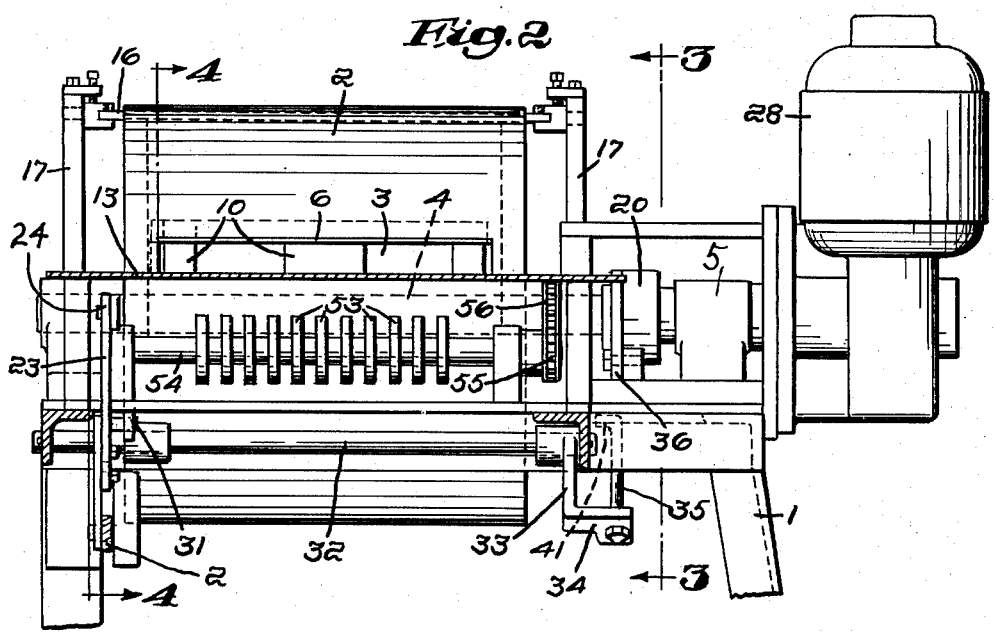
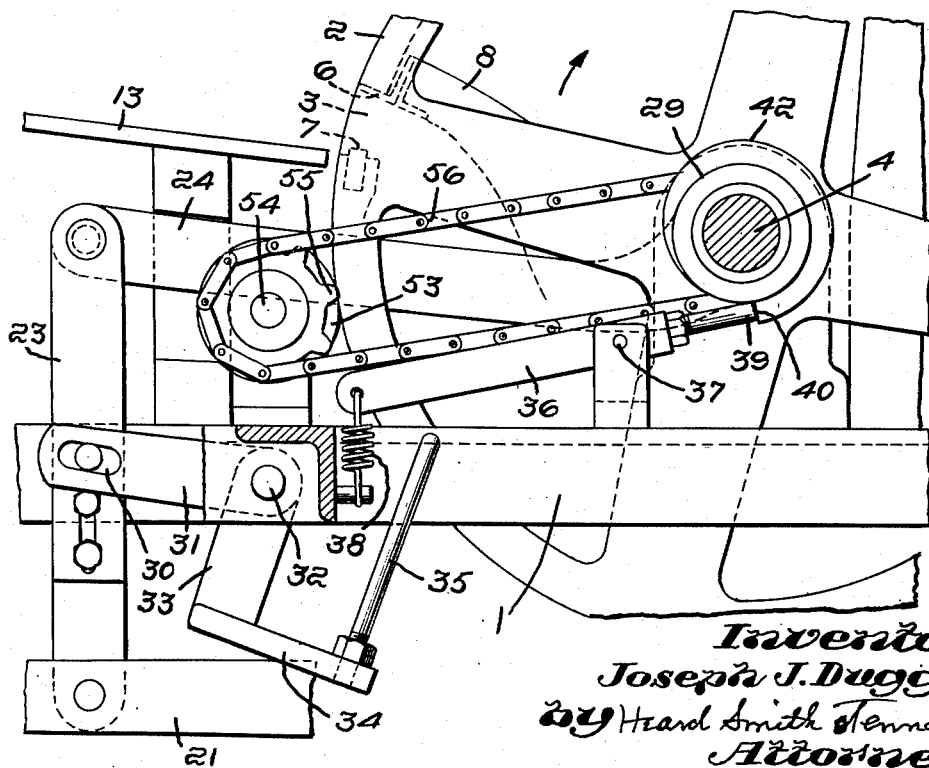
Inventor:
Joseph J. Duggan,
by Heard Smith Tennant
Attorneys

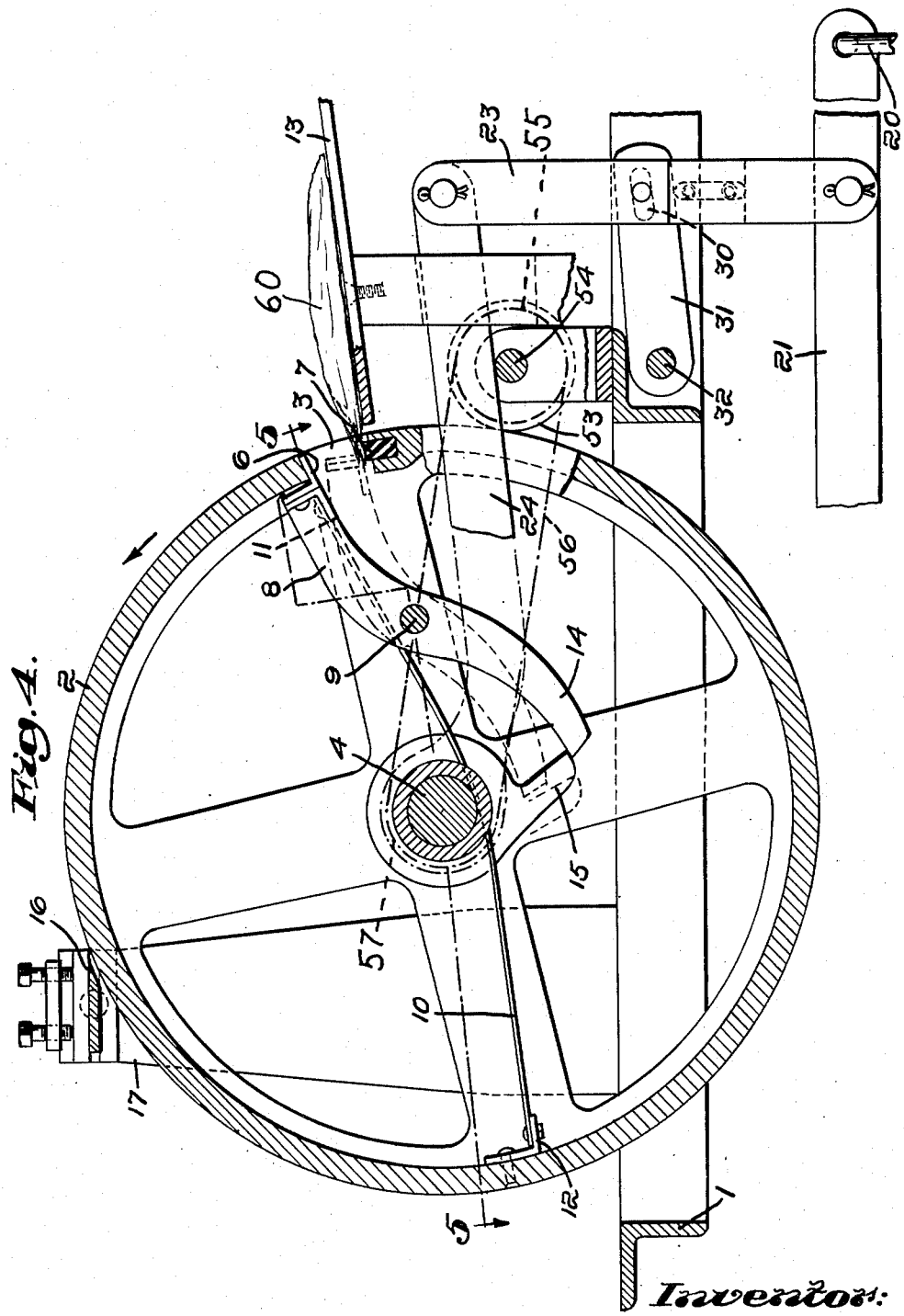

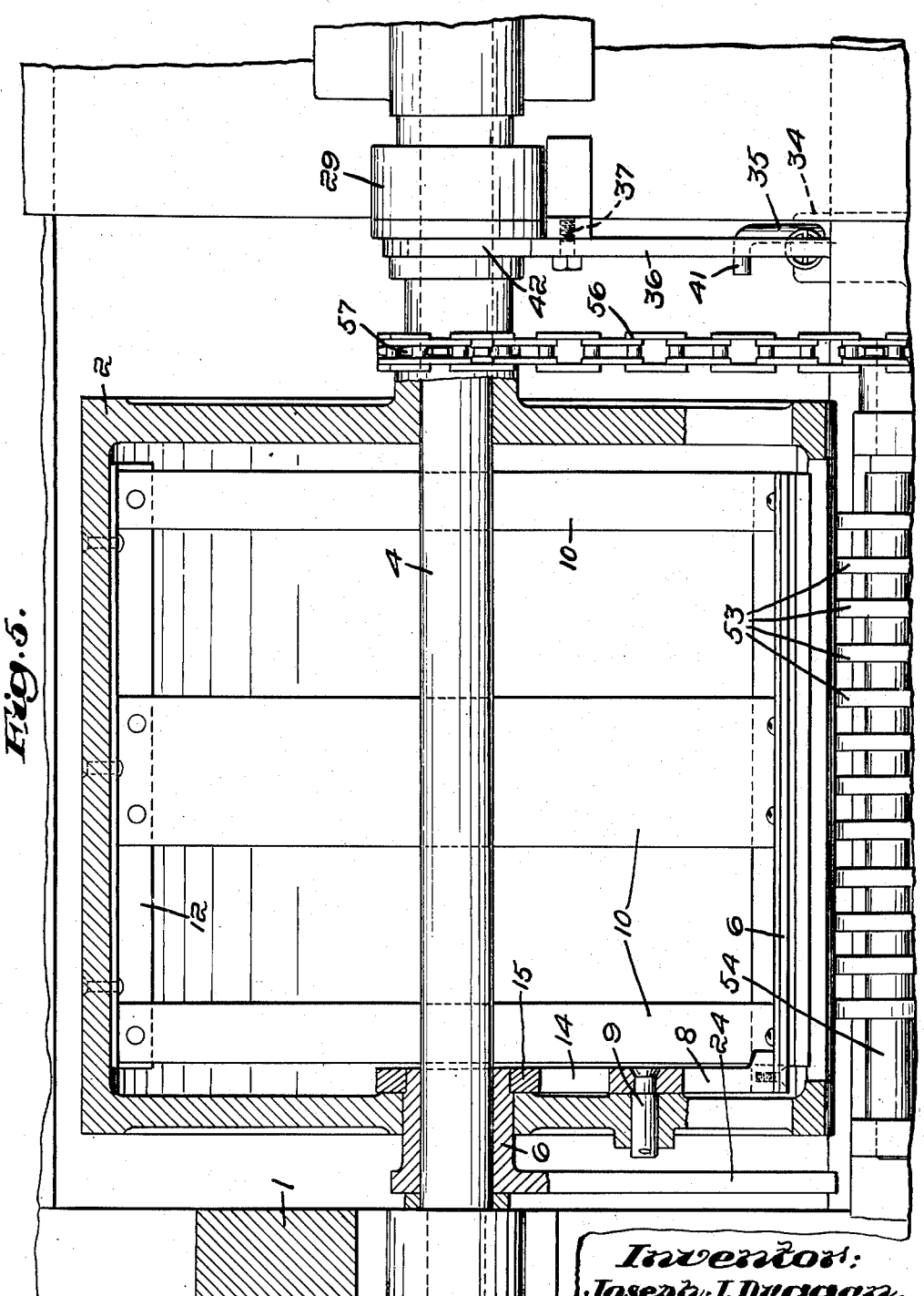

Patented Sept. 18, 1951

2,568,489

UNITED STATES PATENT OFFICE 2,568,489

MACHINE FOR SKINNING FISH FILLETS

Joseph J. Duggan, Wollaston, Mass., assignor of one-third to David S. Blank and one-third to Duncan J. Banks, both of Quincy, Mass.

Application December 28, 1946, Serial No. 719,083

5 Claims. (Cl. 17—4)

This invention relates to a machine for removing the skin from fish fillets, and particularly to a machine of the type shown in Patent No. 1,596,649, August 17, 1926.

The machine shown in said patent has a rotary drum which is in continuous rotation and is provided with a slot to receive the tail end of the unskinned fillet, and a clamp which is rendered operative by the rotative movement of the drum to clamp said tail end in the slot so that the rotary motion of the drum will carry the fillet into position to be acted on by a stationary knife that cuts the flesh from the skin.

One object of the present invention is to provide improvements in a machine of the above type by which the drum is brought to rest at the end of each revolution and the clamp is rendered operative to clamp the end of the unskinned fillet to the drum while the latter is at rest and before it starts its rotative movement, thereby insuring that each unskinned fillet will be properly clamped in position before the drum is set in motion.

Another object of the invention is to provide a device of this type with means for automatically stopping the rotative movement of the drum after each fillet skinning operation and in a position in which the slot in the drum will be in register with a platform from which the unskinned fillet can be fed into the slot.

A further object of the invention is to provide means whereby the drum will be started in motion after the clamp has been operated.

In order to give an understanding of my invention, I have illustrated in the drawings a selected embodiment thereof, which will now be described after which the novel features will be pointed out in the appended claims.

In the drawings:

Fig. 2 is a section on the line 2—2, Fig. 1.

Fig. 3 is an enlarged section on the line 3—3, Fig. 2.

Fig. 4 is an enlarged section on the line 4—4, Fig. 2.

Fig. 5 is a section on the line 5—5, Fig. 4.

Figure 1:
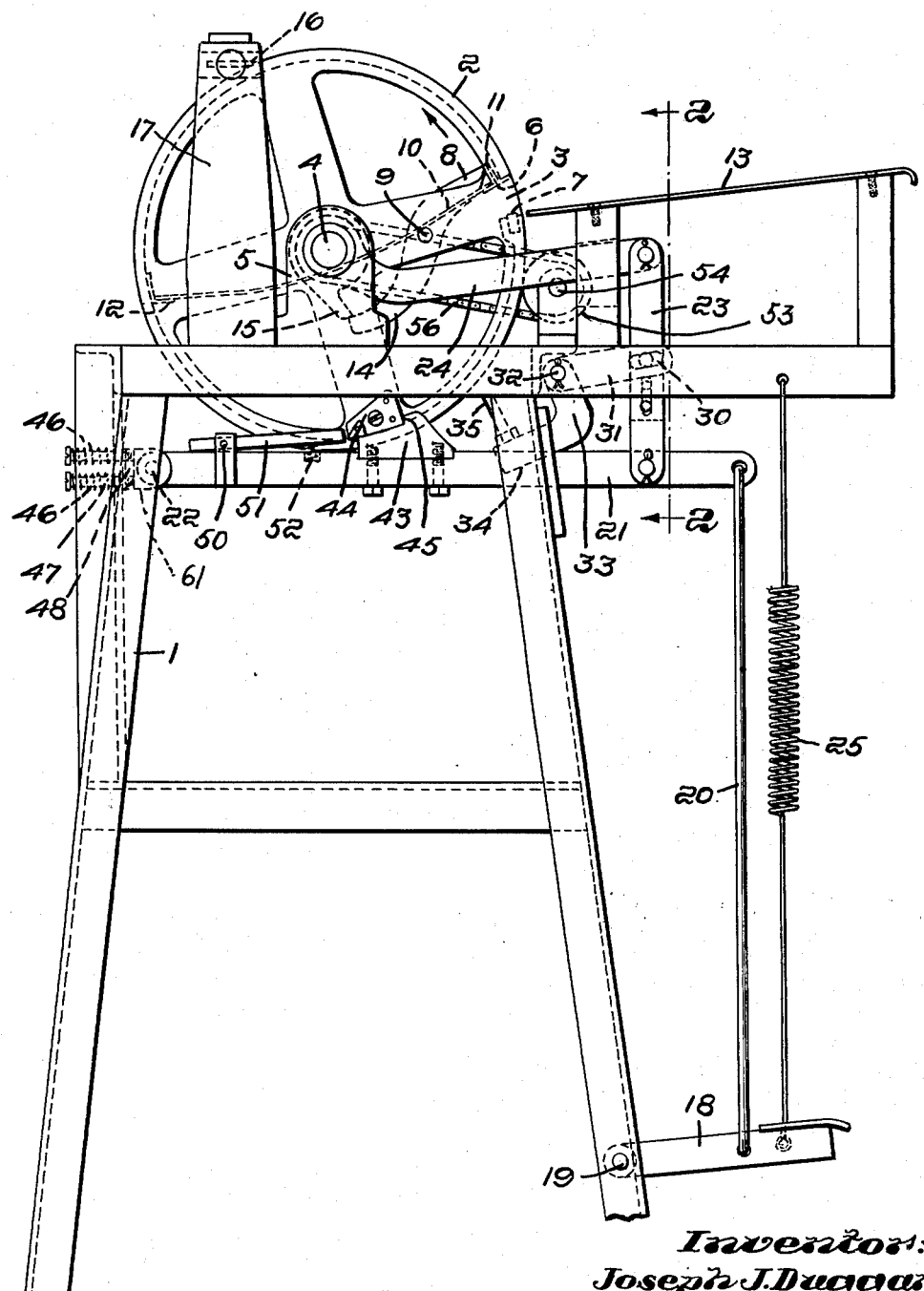
Fig. 1 is a side view of a device embodying my invention.

The machine herein shown comprises a supporting frame 1 on which is rotatively mounted a hollow drum element 2 having a slot 3 extending from one end to the other. Such drum is mounted on a shaft 4 which in turn is journaled in suitable bearings 5 carried by the supporting frame 1. The slot 3 is designed to receive the tail end of an unskinned fish fillet, and there is provided a clamping member 6 which is adapted to clamp said tail end of the fish fillet against one wall of the slot as in the above-mentioned patent. For this purpose said wall of the slot is provided with a clamping bar 7 with which the clamp 6 cooperates. The clamp 6 is carried by an arm 8 which is pivoted to the drum as indicated at 9, and the clamp is acted upon by a spring 10 which tends normally to close the clamp against the clamping bar 7. Said spring 10 is in the form of a long leaf spring, one end 11 of which rests against the back side of the clamping member, and the other end of which rests against a ledge 12 with which the drum is provided, said spring extending underneath the shaft 4 and being flexed thereby so that the end 11 of the spring yieldingly presses against the clamping member 6. The device herein shown is so constructed that after each fillet-skinning operation, the drum 2 is brought to rest with the slot 3 in register with a platform 13 from which unskinned fillets can be fed into the slot, and at this time the clamp 6 is held in its open position as shown in Fig. 4 so that the slot is free to have the end of an unskinned fillet 60 introduced into it as also indicated in Fig. 4. For this purpose the clamp supporting arm 8 is provided with an extension 14 which is acted upon by a cam 15 loosely mounted on the shaft 4 as shown in Fig. 4, but held from rotative movement with the shaft as will be presently described. Associated with the drum is a stationary knife 16 that is carried by a knife-supporting frame 17, the cutting edge of said knife being positioned closely adjacent to the peripheral surface of the drum 2 as indicated in the above-mentioned patent.

In accordance with my invention one end of an unskinned fillet is introduced into the slot 3 while the drum is at rest and before it has started its rotative movement, and while the drum is still at rest, the cam 15 is moved to release it from its engagement with the lever 14 thereby allowing the clamp 6 to close under the influence of the spring 10 and clamp the end of the fish fillet against the clamping member 7 as shown in dotted lines, Fig. 4. Means are also provided whereby after the cam 15 has released the clamp 6 and the end of the fillet has been engaged by the clamping member, the drum 2 will be started in rotation in the direction of the arrow, Fig. 1. The fillet to be skinned that is fed to the drum is placed on the platform 13 with the skin on the under side resting on said platform, and when the drum is rotated in the direction of the arrow after the end of the fillet has been clamped in the slot by the clamp 6, the fillet will be carried forward by the drum with its skin resting against the drum. As the drum carries the fillet past the knife 16, the latter operates to cut the flesh of the fillet from the skin, and the skinned fillet will be deposited in any suitable receptacle. As the drum completes its rotation, the end of the lever 14 comes into engagement with the cam 15 and thereby the clamping member 6 is opened to release the skin.

The means herein shown for releasing the cam 15 from the lever 14 to allow the clamp to close while the drum is still at rest and before it starts its rotative movement comprises treadle element 18 pivoted to the frame 1 at 19 and connected by a link 20 to an arm or lever 21 which in turn is pivoted at 22 to a supporting member 61 that is mounted on the frame 1. The lever 21 is connected by a link 23 to an arm 24 which is mounted on the shaft 4 for slight turning movement and which is rigid with the cam 15. The treadle 18 is acted on by a pulling spring 25 which normally holds it in the elevated position shown in Fig. 1.

When the treadle 18 is depressed, the initial downward movement thereof operates through the lever 21 and the link 23 to give the lever 24 a slight turning movement in a clockwise direction about the shaft 4, and since the cam 15 is rigid with the lever 24, said cam 15 will be turned clockwise, the movement thus given to the cam being sufficient to release it from the end of the lever 14 as shown by dotted lines in Fig. 4. As soon as said lever 14 is thus released, the spring 10 functions to close the clamp 6. All these operations take place while the drum is at rest and before it begins its rotative movement.

The drum 2 receives its motion from some suitable source, such, for instance, as a motor 28, through the medium of a one-revolution friction clutch device 29, and means are provided whereby during the final depressing movement of the treadle 18 and after the clamp 6 has been closed, the clutch 29 will be thrown into operation thereby to start the drum 2 in its rotary movement.

For this purpose the link 23 is connected by a pin and slot connection 30 to an arm 31 that is fast on a shaft 32 that is journaled in the frame, said shaft having rigid therewith another arm 33 provided at its end with a lateral extension 34 from which rises a thrust pin 35.

The one-revolution clutch 29 may be of any suitable or usual type, but that preferably employed is a clutch of the well known roller clutch type having a control element adapted to have a slight turning movement about the clutch axis relative to the driver element and which is constructed so that the relative turning movement of said control element in one direction relative to the driver releases the clutch, and such relative turning movement in the other direction causes the clutch to become operative. Such a clutch is one known to the trade as the Hilliard single revolution clutch. The one revolution clutch is controlled as to its starting and stopping by a clutch-controlling lever 36 pivoted at 37 to the frame 1. Such lever 36 is normally acted on by a pulling spring 38 which tends to hold it in the position shown in Fig. 3, which is the position of said clutch-controlling lever when the clutch is disengaged. At this time the end 39 of said lever is in engagement with a shoulder 40 on a control part of the clutch thereby holding the clutch disengaged.

When the treadle 18 is depressed, the downward movement of the link 23 will swing the arm 31 and the shaft 32 in a counter-clockwise direction (Fig. 3) thereby producing an upward movement in the thrust pin 35. The upper end of this thrust pin is bent laterally as shown at 41, and during the final downward movement of the treadle 18 and the consequent final downward movement of the link 23, the laterally bent portion 41 of the pin 35 will be brought into engagement with the clutch-controlling lever 36, thereby swinging it in a clockwise direction about its pivot and releasing the end 39 from the shoulder 40 of the clutch so that the clutch will become automatically operative to rotate the shaft 4 and thus give rotation to the drum.

When the treadle 18 has been released, the spring 25 will return it and the parts 31, 32, 33, 34 and 35 to their normal position shown in Fig. 3, and the spring 38 will swing the clutch-controlling lever 36 into a position so that the outer end thereof engages the cam face 42 of the clutch so that when the clutch has made one revolution, it will be automatically disengaged by the shoulder 40 coming up against the end 39 of the lever 36.

Means are also provided for stopping the rotative movement of the drum as soon as the clutch is disengaged so that the drum will be prevented from over-running and will be brought to rest with the slot 3 thereof in register with the platform 13 as shown in Fig. 1.

For this purpose the arm 21 is provided with a suitable block 43, and the drum is provided with a stop lug 44 which is adapted to engage the shoulder 45 of the stop block when the drum reaches its loading position shown in Fig. 1. These parts are so arranged that the stop lug 44 comes into engagement with the shoulder 45 just after the clutch has been disengaged, thereby bringing the drum immediately to rest and obviating any over-running movement. The supporting member 61 to which the lever 21 is pivoted is supported on the frame 1 so as to be yieldable in the direction of the length of said lever in order to cushion the shock of the engagement between the stop lug 44 and the shoulder 45. For this purpose said supporting member 61 is provided with two headed studs 46 each of which extends through the portion 48 of the frame and is surrounded by a cushioning spring 47 that is confined between the head of the stud and said frame portion 48. The yielding mounting of the supporting member 61 allows the lever arm 21 to have cushioning movement to the right when the stop lug 44 is brought up against the stop shoulder 45.

The downward movement of the arm 21 resulting from the depression of the treadle 18 operates to release the shoulder 45 from the stop lug 44 so that the drum is free to begin its rotative movement as soon as the clutch 29 is thrown into operation.

The arm 21 has pivoted to it at 50 a stop lever 51 which is backed by a spring 52. This lever is for the purpose of preventing any rebound of the drum after it is brought to rest as above described. As the drum approaches the end of its rotative movement, the stop lug 44 wipes over the member 51 and depresses the latter against the spring 52. As soon as the stop lug 44 passes off from the end of the member 51 and comes into contact with the shoulder 45, the spring 52 raises the stop lever 51 in behind the stop lug 44 and thereby prevents any rebound or reverse movement of the drum.

From the above, it will be observed that normally the drum is in a position of rest as shown in Figs. 1 and 4, and while it is in this position, the operator feeds an unskinned fillet forward on the platform 13 so as to introduce the end of the fillet, usually the tail end, into the slot. Said operator then depresses the treadle 18 and during the initial downward movement thereof and while the drum is still at rest, the cam 15 is moved from the full to the dotted line position Fig. 4 thereby releasing the clamp 6, with the result that the spring 10 moves it into operative position to clamp the tail end of the unskinned fillet against the clamping bar 7. Further downward movement of the link 23 resulting from the final downward movement of the treadle operates to throw the clutch 29 into engagement, thereby to start the drum 2 in rotation. As the fillet, which is clamped in the slot, is carried by the drum past the knife 16, the latter will cut the flesh from the skin.

As the drum approaches the end of its rotative movement, the arm 14 wipes over the cam 15 thereby automatically opening the clamp 6 so as to release the fish skin, it being understood that said cam 15 is returned to its operative position shown in Fig. 1 and in full lines in Fig. 4, when the treadle 18 is released.

As the drum completes its rotative movement, it is brought to rest by the stop mechanism above described with the slot 3 registering with the platform 13 and ready to receive the tail end of another unskinned fillet.

There is provided herein means for stripping from the drum any fish skin which may adhere thereto. The means for this purpose comprises a plurality of rotary stripping elements 53 which are mounted on a shaft 54 journaled in the frame and situated beneath the platform 13. The shaft 54 is driven in a counterclockwise direction from the shaft 4, and said rotary elements 53 by their engagement with the drum and by their direction of rotation serve to strip from the drum any fish skin which may adhere thereto. For driving the shaft 54, the latter is provided with a sprocket wheel 55 which is connected by a sprocket chain 56 with a sprocket wheel 57 fast on the shaft 4.

I claim:

1. A machine for skinning fish fillets comprising a frame, a rotary drum mounted thereon and having a slot, means operably associated with said drum including a one-revolution clutch to rotate the drum and bring it to rest at the end of each rotation, a spring-actuated clamping member carried by the drum and cooperating with one wall of said slot for clamping the end of a fillet in said slot, means holding the clamping member inoperative when the drum is in its position of rest, manually operated means to render the clamping member operative while the drum is at rest and while the clutch is still disengaged, and means associated with said manually operated means to render the clutch operative after the clamping member has become operative.

2. A machine of the class described comprising a frame, a rotary drum mounted thereon and having a slot, means supported by the frame and including a one-revolution clutch to rotate the drum and to bring it to rest at the end of each rotation, a spring-biased clamping member carried by the drum and cooperating with one wall of the slot to clamp the end of a fish fillet therein, a cam carried by the frame and holding the clamping member inoperative when the drum is in its position of rest, means common to both the cam and the clutch to first disengage the cam from the clamping member thereby allowing it to close and then to throw the clutch into engagement whereby the clamp is closed while the drum is still at rest and before the clutch is rendered operative.

3. A machine for skinning fish fillets comprising a rotary drum having a slot, drum supporting means, means associated with said drum including a one-revolution clutch to rotate the drum and bring it to rest at the end of each rotation, a clamping member pivotally carried by the drum and cooperating with one wall of the slot to clamp the end of a fillet to be skinned, means carried by the drum supporting means holding the clamping member inoperative when the drum is in its position of rest, a depressable treadle member, means connected therewith and operative during the initial downward movement of the treadle to release the clamping member, a spring acting on the clamping member and automatically moving it into clamping position when it is released, and means operative during the final downward movement of the treadle and after the clamp has moved into operative position to throw the clutch into engagement and thereby start the drum in rotation.

4. A machine of the class described comprising a frame, a rotary drum mounted thereon, said drum having a slot, means associated with said drum including a one-revolution clutch to rotate the drum and bring it to rest at the end of each rotation, a spring-biased clamping member pivotally carried by the drum and cooperating with one wall of the slot to clamp the end of a fish fillet therein, said clamping member having an arm extension, a cam situated co-axially with the drum but turnable relative thereto, said cam acting on said arm extension when the drum is in its position of rest to hold the clamping member open, a depressable treadle element, means actuated by the initial depressing movement of the treadle element and while the drum is at rest to turn the cam relative to the drum and thereby release the arm extension whereby the spring-biased clamping member is automatically closed against said wall of the slot, and means actuated by the final depressing movement of the treadle element and after the clamping member has been closed to render the clutch operative to start the drum in rotation.

5. A machine for skinning fish fillets comprising a frame, a rotary drum carried thereby and having a slot, means associated with said drum including a one-revolution clutch to rotate the drum and to bring it to rest at the end of each rotation, a clamping member carried by the drum and cooperating with one wall of said slot to clamp the end of a fish fillet to be skinned, means holding the clamping member inoperative when the drum is in its position of rest, a depressable treadle element, means connected therewith to render the clutch operative during the final depressing movement of the treadle only, and means also connected with said treadle to release the clamping member during the initial depressing movement of the treadle element whereby the clamping member is automatically closed before the clutch is engaged and while the drum is still at rest.

JOSEPH J. DUGGAN.

REFERENCES CITED

The following references are of record in the file of this patent:

UNITED STATES PATENTS

| Number | Name | Date |
|---|---|---|
| 1,596,649 | Barry | Aug. 17, 1926 |
| 2,298,970 | Russell et al. | Oct. 13, 1942 |

FOREIGN PATENTS

| Number | Country | Date |
|---|---|---|
| 69,707 | Norway | Oct. 29, 1945 |